(12) United States Patent
Tschemeris et al.

(10) Patent No.: US 11,420,499 B2
(45) Date of Patent: Aug. 23, 2022

(54) ELECTRIC HEATING DEVICE

(71) Applicant: MAHLE International GmbH, Stuttgart (DE)

(72) Inventors: Igor Tschemeris, Kornwestheim (DE); Alexander Daniel, Stuttgart (DE); Karim-Mathieu Bouchalat, Stuttgart (DE); Michael Kohl, Bietigheim-Bissingen (DE)

(73) Assignee: MAHLE International GmbH, Stuttgart (DE)

( * ) Notice: Subject to any disclaimer, the term of this patent is extended or adjusted under 35 U.S.C. 154(b) by 463 days.

(21) Appl. No.: 16/567,583

(22) Filed: Sep. 11, 2019

(65) Prior Publication Data

US 2020/0079180 A1 Mar. 12, 2020

(30) Foreign Application Priority Data

Sep. 11, 2018 (DE) ...................... 10 2018 215 398.1

(51) Int. Cl.
*B60H 1/22* (2006.01)
*H05B 3/32* (2006.01)

(52) U.S. Cl.
CPC ............. *B60H 1/2225* (2013.01); *H05B 3/32* (2013.01); *H05B 2203/017* (2013.01); *H05B 2203/023* (2013.01)

(58) Field of Classification Search
CPC ...... B60H 1/2225; B60H 1/2221; H05B 3/32; H05B 3/06; H05B 3/86; H05B 3/141; H05B 3/24; H05B 2203/017; H05B 2203/023; H05B 2203/021; H05B 2203/024; H05B 2203/02; F24H 1/10; F24H 1/101; F24H 1/121; F24H 9/0045; F24H 9/1827; F24H 9/146; F24H 2250/04; F28D 1/0308; F28D 1/0341

See application file for complete search history.

(56) References Cited

U.S. PATENT DOCUMENTS

| 4,334,141 A | 6/1982 | Roller et al. |
| 6,852,955 B1 * | 2/2005 | Golan ..................... C09J 9/02 |
| | | 219/505 |
| 9,506,698 B2 | 11/2016 | Kohl et al. |

(Continued)

FOREIGN PATENT DOCUMENTS

| CN | 204801453 U | 11/2015 |
| CN | 107791786 A | 3/2018 |

(Continued)

*Primary Examiner* — Shawntina T Fuqua
(74) *Attorney, Agent, or Firm* — Muncy, Geissler, Olds & Lowe, P.C.

(57) ABSTRACT

An electric heating device and a method for manufacturing an electric heating device with at least two plate pairs forming a fluid passage through which fluid can flow, which plate pairs are assembled from two plates and form a fluid passage between the two, wherein the plate pairs take on a predefined distance from one another and form a free space, wherein at least one heating unit is arranged in the free space between at least two of the plate pairs, which heating unit has at least one heating element and contact electrodes electrically connected thereto for making electrical contact with the at least one heating element. The invention also relates to such an electric heating device.

27 Claims, 5 Drawing Sheets

(56) References Cited

U.S. PATENT DOCUMENTS

| | | | |
|---|---|---|---|
| 10,302,331 B2 | 5/2019 | Kohl et al. | |
| 2007/0056720 A1* | 3/2007 | Demuth | F28F 9/0278 |
| | | | 165/158 |
| 2015/0117846 A1* | 4/2015 | Kohl | F24H 9/146 |
| | | | 392/479 |

FOREIGN PATENT DOCUMENTS

| | | |
|---|---|---|
| DE | 28 04 749 A1 | 8/1979 |
| DE | 28 04 818 A1 | 8/1979 |
| DE | 10 2011 088 773 A1 | 6/2013 |
| EP | 2 397 788 A1 | 12/2011 |
| WO | WO 2013/087671 A1 | 6/2013 |

\* cited by examiner

ELECTRIC HEATING DEVICE

This nonprovisional application claims priority under 35 U.S.C. § 119(a) to German Patent Application No. 10 2018 215 398.1, which was filed in Germany on Sep. 11, 2018, and which is herein incorporated by reference.

BACKGROUND OF THE INVENTION

Field of the Invention

The present invention relates to an electric heating device, in particular for heating a fluid to heat a passenger compartment of a motor vehicle and/or for heating a component assembly of the motor vehicle. The invention also relates to a method for manufacturing an electric heating device.

Description of the Background Art

Motor vehicles usually have a heatable passenger compartment. To this end, motor vehicles with internal combustion engines usually have a heater core connected in the cooling circuit of an internal combustion engine through which hot coolant flows that has been heated by the internal combustion engine. The coolant in this context is primarily used to cool the internal combustion engine. The waste heat of the internal combustion engine is transferred to the coolant and is used in the heater core to heat the passenger compartment. In this case, the air flowing through the heater core is heated by the coolant through heat transfer and is delivered to the passenger compartment.

In particular, motor vehicles with fuel-efficient internal combustion engines, which produce less waste heat, and motor vehicles with plug-in charging/range extenders, but also other vehicles, require auxiliary heating devices for passenger compartment heating.

Thus, an electric heating device has become known through WO 2013/087671 A1, which corresponds to U.S. Pat. No. 9,506,698, and which is incorporated herein by reference, that serves to electrically heat a fluid when the waste heat of the internal combustion engine is not yet sufficient or is not even present, for example because the motor vehicle in question does not have such an internal combustion engine.

Conventional electric heating devices have a multiplicity of plate pairs, which are formed of plates arranged and connected to one another at predefined mutual distances, which in each case form a fluid passage so that the fluid to be heated can flow through the relevant plate pair in order to be heated. The respective plate pairs in this design are arranged at such a distance from one another that a heating unit can be arranged between every two adjacent plate pairs, which heating unit has at least one heating element, contact electrodes that are electrically connected thereto, and insulating elements. In this design, the insulating elements in the form of films serve to electrically insulate the heating unit from the two plate pairs.

In this design, the electric heating device is formed of a great number of components, which must be connected to one another and attached so that the electric heating device can be used with lasting reliability in operation of a motor vehicle.

SUMMARY OF THE INVENTION

It is therefore an object of the present invention to provide a method for manufacturing an electric heating device that reduces the costs of manufacture, facilitates manufacturability of the electric heating device, and makes it possible to create an improved electric heating device. The object is also to create an improved electric heating device.

An exemplary embodiment of the invention relates to a method for manufacturing an electric heating device with at least two plate pairs forming a fluid passage through which fluid can flow, which plate pairs are assembled from two plates and form a fluid passage between the two, wherein the plate pairs take on a predefined distance from one another and form a free space, wherein at least one heating unit is arranged in the free space between at least two of the plate pairs, which heating unit has at least one heating element and contact electrodes electrically connected thereto for making electrical contact with the at least one heating element, having the steps: providing and stacking the plates into a stack of plates and/or plate pairs, soldering the stack of plates, and inserting and attaching the heating unit in the free space.

This achieves the result that the heating unit or units are positioned securely and have good thermal contact. In this way, an electric heating device can be created in a simple manner and with few components that also satisfies the stringent requirements for high voltage applications of more than 60 V, in particular up to 400 V or up to approximately 800 V.

In this context it is also advantageous when the attachment of the heating unit in the free space to the plate pairs is accomplished with at least one adhesive. A secure attachment with good thermal conductivity can be achieved in this way, especially when the layer of adhesive is thin.

It is also advantageous when the at least one adhesive is fed into the free space before the insertion of the heating unit or that the at least one adhesive is fed into the remaining free space after the insertion of the heating unit. In this way, good adhesive bonding can be achieved with secure and full-area contact.

It is especially advantageous when a partial sealing of one side at a time of at least one free space is accomplished by means of sealing elements before the at least one adhesive is fed into the free space. In this way an uncontrolled outflow of the adhesive can be prevented.

Furthermore, it is also advantageous when a filling of the partially sealed free space is accomplished with at least one adhesive. In this way the adhesive can be fed into the free space well, and the heating unit can then be inserted.

Thus, it is also useful when an insertion of the heating unit into the free space filled with the at least one adhesive takes place, or the heating unit is inserted into the free space before the feeding of the at least one adhesive and subsequently the at least one adhesive is fed, in particular, into the free space that has been partially sealed beforehand.

It is advantageous when a curing of the at least one adhesive subsequently occurs. In this way, depending on the adhesive used, a cured material can be achieved as insulation and as retaining material.

It is also useful when the at least one adhesive is an adhesive substance, a silicone compound, a potting compound, a cross-linkable plastic molding compound, and/or a flowable substance. In this way, the bonding or adhesive bonding of the heating unit and plate pair can be achieved in a practical manner in order to achieve securing in place and good thermal contact.

It is also advantageous when multiple different adhesives are used. Depending on the field of application, these can have different electrical and/or thermal properties. Thus, one adhesive can be electrically insulating and the other can be too, for example, or else it can also be electrically conductive. The thermal conductivity can vary, as well.

If sealing elements are used, it can be advantageous if the sealing elements are removed after the at least one adhesive has cured. It is no longer necessary for them to remain then, since they only served as barriers for the adhesive. Alternatively, they can also remain if this would be acceptable in terms of installation space and weight.

Advantageously, the at least one adhesive is electrically insulating and thermally conductive. As a result, the electrical insulation is improved with good thermal bonding.

It is also advantageous when the adhesive contains agents and/or particles for improving the thermal conductivity of the adhesive. The thermal bonding can be improved by this means.

The object concerning the method is also attained by a method for manufacturing an electric heating device with at least two plate pairs forming a fluid passage through which fluid can flow, which plate pairs are assembled from two plates and form a fluid passage between the two, wherein the plate pairs take on a predefined distance from one another and form a free space, wherein at least one heating unit is arranged in the free space between at least two of the plate pairs, which heating unit has at least one heating element and contact electrodes electrically connected thereto for making electrical contact with the at least one heating element, having the steps: providing and stacking the plates into a stack of plates and/or plate pairs, soldering the stack of plates, partial sealing of one side at a time of at least one free space by means of sealing elements, filling of the partially sealed free space with an adhesive, inserting the heating unit into the free space filled with the adhesive, and curing of the adhesive.

In this way, an electric heating device can be created in a simple manner and with few components that also satisfies the stringent requirements for high voltage applications of more than 60 V, in particular up to 400 V or up to approximately 800 V. The sealing elements allow reliable feeding of the adhesive prior to insertion of the heating unit, and the insertion of the heating unit ensures uniform distribution of the adhesive. The electric heating device can have just one heating unit in one of the free spaces, or can also have a multiplicity of heating units, wherein advantageously each heating unit is assigned to a free space. In this case, provision can also be made that one heating unit or a multiplicity of heating units are assigned to each of the free spaces that are used. Occasional free spaces may also remain unoccupied.

It is especially advantageous in this design when the sealing elements are removed after the adhesive has cured. These sealing elements are no longer needed, and can remain where they are, or can be removed again to save weight.

It is also advantageous when the adhesive is electrically insulating and thermally conductive. As a result, the adhesive can also be used for the purpose of electrically insulating the contact electrodes of the heating unit from the plates.

In an exemplary embodiment, it is also advantageous when the adhesive is a flowable substance, as for example, a flowable silicone compound. As a result, it is possible to allow the adhesive to run into or to be aspirated into the free spaces so that the adhesive can be well distributed, so that the heating unit can be well bonded, and in particular bonded over its full area, during the subsequent insertion.

So that the adhesive produces a relatively low thermal resistance overall, it is advantageous in one exemplary embodiment when the adhesive contains agents and/or particles for improving the thermal conductivity of the adhesive.

It is also especially advantageous when the free space is at least partially evacuated prior to the filling with the adhesive. As a result, the adhesive can be fed or aspirated without air bubbles or air inclusions being produced, or with only a few or small ones being produced.

Moreover, it is also advantageous when excess adhesive is expelled from the free space during insertion of the heating unit into the free space. Thus, somewhat more adhesive than is required is advantageously fed so as to expel residual adhesive. This achieves the result that largely no air bubbles and no regions without adhesive remain.

It is also advantageous in an exemplary embodiment when the heating unit has a frame for arrangement of the heating elements of the heating unit relative to one another and/or for defined positioning of the heating elements of the heating unit in the free space. Due to the frame, the heating unit can be held together or positioned, for example, and at the same time the frame can also serve to distribute the adhesive.

It is also advantageous when the stack of plate pairs is provided with an inlet connection and with an outlet connection, in particular prior to soldering, and/or the fluid passages of the plate pairs are in fluid connection with one another. By this means, the through-flow can be defined and the connection situation can be chosen. For example, an I-shaped through-flow or a U-shaped through-flow can be provided.

In an exemplary embodiment, it is also advantageous when the inlet connection and the outlet connection are arranged on the same plate pair of the stack, such as in particular on an end plate pair of the stack, or that the inlet connection and the outlet connection are arranged on different plate pairs of the stack, such as in particular on opposing end plate pairs of the stack. By this means as well, the through-flow can be defined and the connection situation can be chosen. For example, an I-shaped through-flow or a U-shaped through-flow can be provided.

An exemplary embodiment relates to an electric heating device having at least two plate pairs forming a fluid passage through which fluid can flow, which plate pairs are assembled from two plates and form a fluid passage between the two, wherein the plate pairs take on a predefined distance from one another and form a free space, wherein at least one heating unit is arranged in the free space between at least two of the plate pairs, which heating unit has at least one heating element and contact electrodes electrically connected thereto for making electrical contact with the at least one heating element, wherein the heating unit is held in the free space by means of at least one adhesive, and the at least one adhesive simultaneously forms the electrical insulation of the contact electrodes with respect to the relevant adjacent plate.

It is advantageous when the stack of plates is soldered and the at least one heating unit or the heating units is or are inserted into the relevant free space after the soldering.

It is also advantageous when the at least one adhesive is electrically insulating and thermally conductive.

It is also useful when the at least one adhesive is an adhesive substance, a silicone compound, a potting compound, a cross-linkable plastic molding compound, and/or a flowable substance.

It is likewise useful when the at least one adhesive contains agents and/or particles for improving the thermal conductivity of the adhesive.

It is advantageous when the heating unit has a frame for arrangement of the heating elements of the heating unit relative to one another and/or for defined positioning of the heating elements of the heating unit in the free space and/or for distribution of the adhesive.

It is especially advantageous when the frame surrounds or delimits the heating unit on at least three sides or on four sides.

It is also advantageous when the frame is designed as a rigid frame or as a collapsible frame.

It is also useful when at least one projecting edge, in particular beveled edge, at least one ridge, at least one nub is or are provided on the frame for distribution of the adhesive.

It is also advantageous when a ridge, in particular central ridge, is provided that projects from the edge.

The object concerning the electric heating device is also attained with an electric heating device having at least two plate pairs forming a fluid passage through which fluid can flow, which plate pairs are assembled from two plates and form a fluid passage between the two, wherein the plate pairs take on a predefined distance from one another and form a free space, wherein at least one heating unit is arranged in the free space between at least two of the plate pairs, which heating unit has at least one heating element and contact electrodes electrically connected thereto for making electrical contact with the at least one heating element, wherein the heating unit is held in the free space by means of an adhesive, and the adhesive simultaneously forms the electrical insulation of the contact electrodes with respect to the relevant adjacent plate. By this means, an advantageous electric heating device is created that operates with few components and is nevertheless reliable and, in particular, is also suitable for high voltage applications.

In an exemplary embodiment, it is also advantageous when the stack of plates is soldered and the at least one heating unit or the heating units is or are inserted into the relevant free space after the soldering. As a result, the stack of plates can be prepared and connected in a sealed manner, wherein the inlet connection and the outlet connection, for example, are advantageously also soldered at the same time, for example in the form of a connecting pipe or connecting flange. Alternatively, the inlet connection and the outlet connection, for example in the form of a connecting pipe or connecting flange, can be attached later, such as soldered on and/or welded and/or adhesive-bonded. By this means, a compact, preassembled unit of the stack can be created as a whole, which subsequently is equipped with the heating unit or the heating units, wherein the heating unit is inserted into the intended free space or the heating units are inserted into the intended free spaces.

It is also advantageous when the adhesive is electrically insulating and thermally conductive. This makes it possible to achieve the result that the contact electrodes are electrically insulated from the plates located next to them by means of the adhesive. In this way, the use of insulating films can be avoided, for example.

It is especially advantageous when the adhesive is a flowable substance, as for example, a flowable silicone compound. As a result, it can advantageously be placed in the free spaces in a simple way. This can be accomplished, for example, by means of a nozzle or the like.

In an exemplary embodiment, it is advantageous when the adhesive contains agents and/or particles for improving the thermal conductivity of the adhesive. Heat transfer through the layer of cured adhesive is improved in this way.

It is also advantageous when the heating unit has a frame for arrangement of the heating elements of the heating unit relative to one another and/or for defined positioning of the heating elements of the heating unit in the free space and/or for distribution of the adhesive. The frame in this case can also serve, in particular, to distribute the adhesive when the heating unit is inserted into the free space.

In this case it is advantageous when the frame surrounds or delimits the heating unit on at least three sides or on four sides. In this case the frame can wrap around the heating unit at the sides, such as at short side edges and at one long side edge, and can serve to distribute the adhesive.

In this case it is also advantageous when the frame is designed as a rigid frame or as a collapsible frame. In this case, the rigid frame can be easily slipped on or attached, and the collapsible frame can be folded onto the heating unit.

It is also advantageous when at least one projecting edge, in particular beveled edge, at least one ridge, at least one nub is or are provided on the frame for distribution of the adhesive. For example, projecting ridges are provided on the short side edges, in particular on both opposing side faces, which ridges define the distance of the heating unit or the contact electrodes from the plates.

It can also be advantageous when a ridge, in particular central ridge, is provided that projects from the edge. As a result, a centrally provided distance from the plates can be defined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

FIGS. 1 through 6 show different views of an exemplary embodiment of an electric heating device 1 according to the invention or details thereof.

Figure 1:
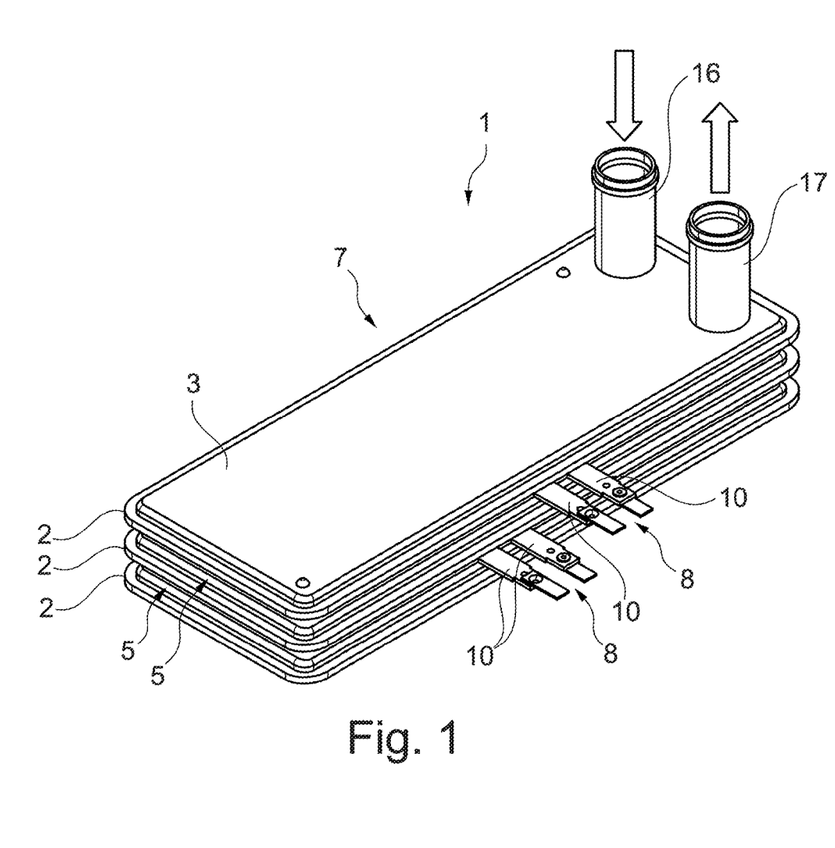
FIG. 1 is a perspective view of an exemplary embodiment of an electric heating device according to the invention.
Figure 2:
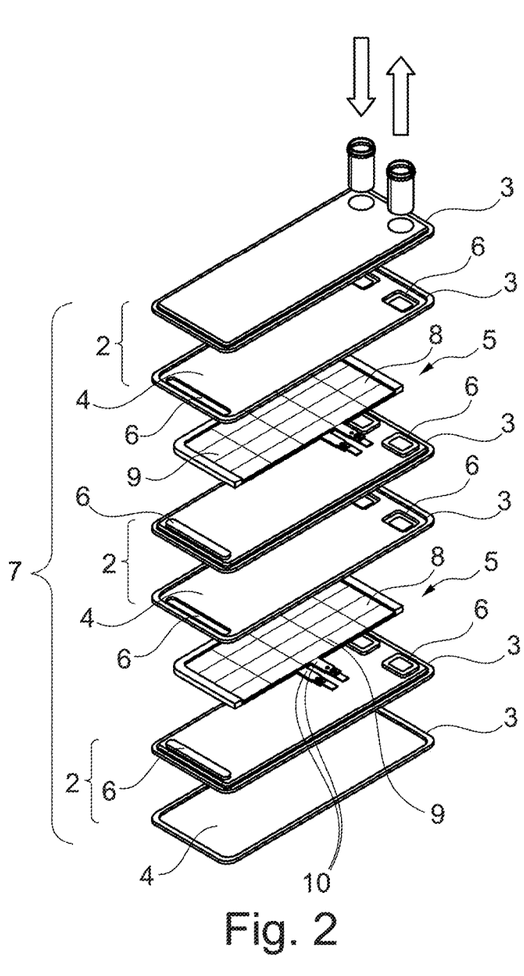
FIG. 2 is an exploded view of the electric heating device according to the invention.

According to FIGS. 1 and 2, the electric heating device 1 according to the invention has at least two plate pairs 2 forming a fluid passage 4 through which fluid can flow, which plate pairs are assembled from two plates 3 and form between them the fluid passage 4.

The plate pairs 2 are arranged at a predefined distance from one another and form a free space 5 between them. The distance is achieved through formed features 6 on the plates 3, which are provided on the two narrow end regions of the plates 3, wherein the formed features 6 of two adjacent plates 3 of adjacent plate pairs 2 touch one another, and thus hold the plates 3 or the plate pairs 2 at a distance.

The plate pairs 2 form a stack 7 of plate pairs 2. These plate pairs 2 and the stack 7 are soldered.

After the soldering, at least one heating unit 8 is arranged in the free space 5 between at least two of the plate pairs 2, which heating unit has at least one heating element 9 or a multiplicity of heating elements 9 and contact electrodes 10 electrically connected thereto for making electrical contact with the at least one heating element 9. It is possible, in particular, for several such heating elements 9 to be provided, in particular in each of the free spaces 5.

The heating unit 8 is held in the free space 5 by means of an adhesive, wherein the adhesive simultaneously forms the electrical insulation 11 of the contact electrodes 10 with respect to the relevant adjacent plate 3.

Figure 3:
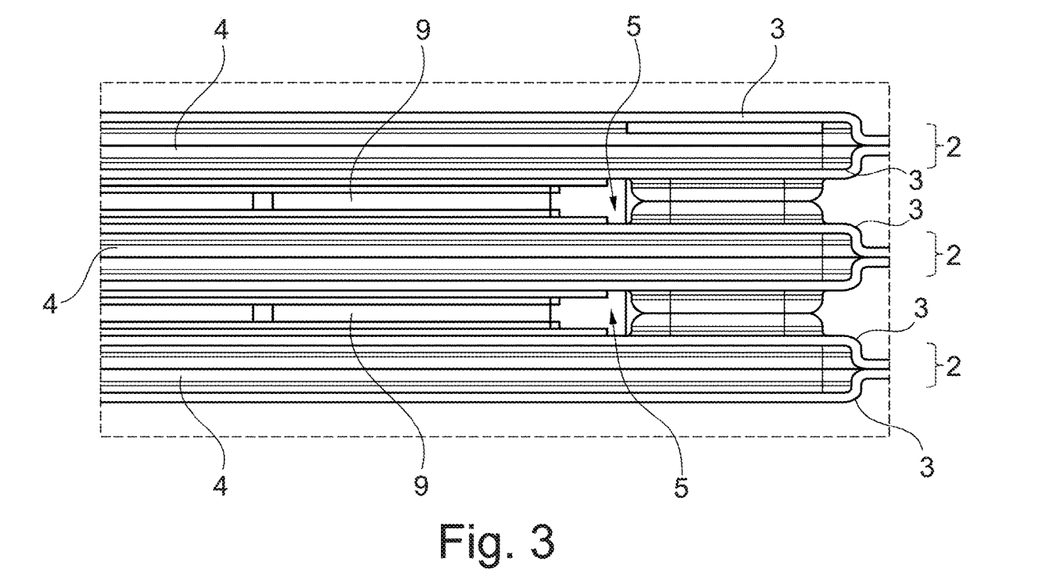
FIG. 3 is a partial sectional view of the electric heating device according to the invention.
Figure 4:
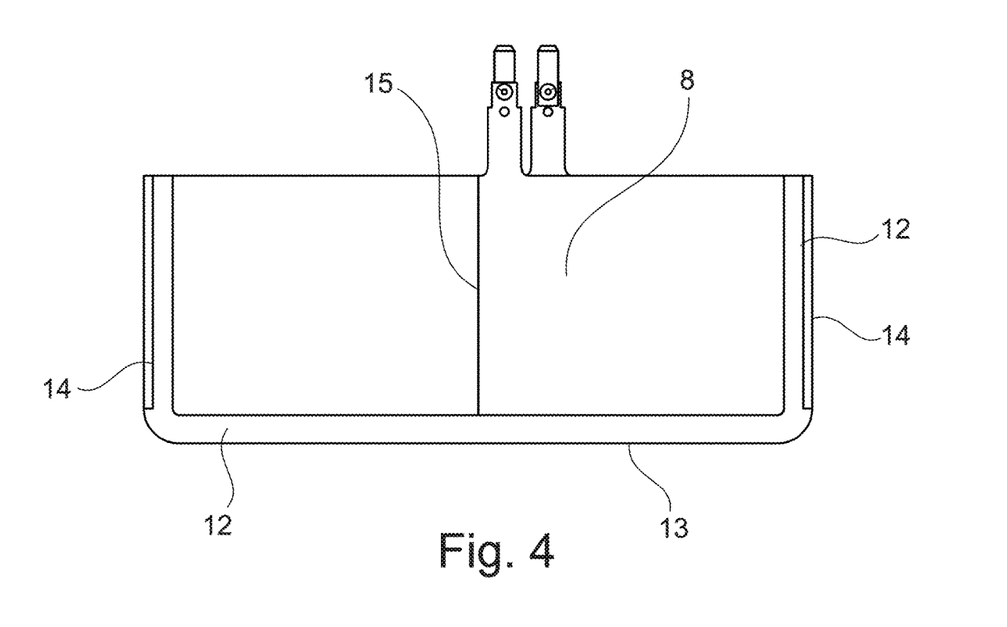
FIG. 4 is a side view of a heating unit of the electric heating device according to the invention.

To manufacture the electric heating device 1, the stack 7 of plates 3 is attached by soldering, and the at least one heating unit 8 or the heating units 8 is or are inserted into the relevant free space 5 after the soldering. FIGS. 3 and 4 show a side view and a cross-section through the stack 7.

The stack 7 of plate pairs 2 is provided with an inlet connection 16 and with an outlet connection 17, in particular prior to soldering. In this case, the fluid passages of the plate pairs 2 are advantageously in fluid connection with one another.

Advantageously, the inlet connection 16 and the outlet connection 17 can be arranged on the same plate pair 2 of the stack 7, such as in particular on an end plate pair of the stack 7, or the inlet connection 16 and the outlet connection 17 can be arranged on different plate pairs 2 of the stack 7, such as in particular on opposing end plate pairs of the stack 7.

The adhesive that is used to bond the relevant heating unit 8 preferably is designed to be electrically insulating and thermally conductive. The adhesive preferentially is a flowable substance, such as, in particular, a flowable silicone compound, which is fed into the free spaces 5 and subsequently inserted or pushed into the heating units 8, wherein the adhesive fed into the free space 5 is distributed therewith and fills in cavities and expels excess adhesive.

It is also advantageous when the adhesive contains agents and/or particles for improving the thermal conductivity of the adhesive. Such agents can be ceramic particles, graphite, etc., for example.

Figure 5:
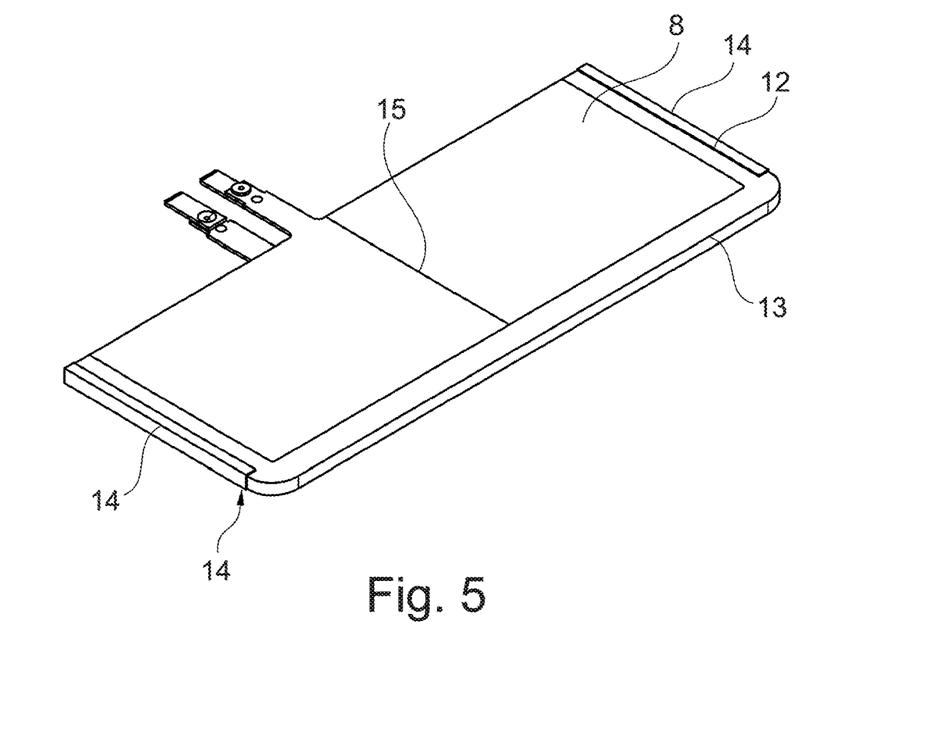
FIG. 5 is a perspective view of the heating unit.
Figure 6:
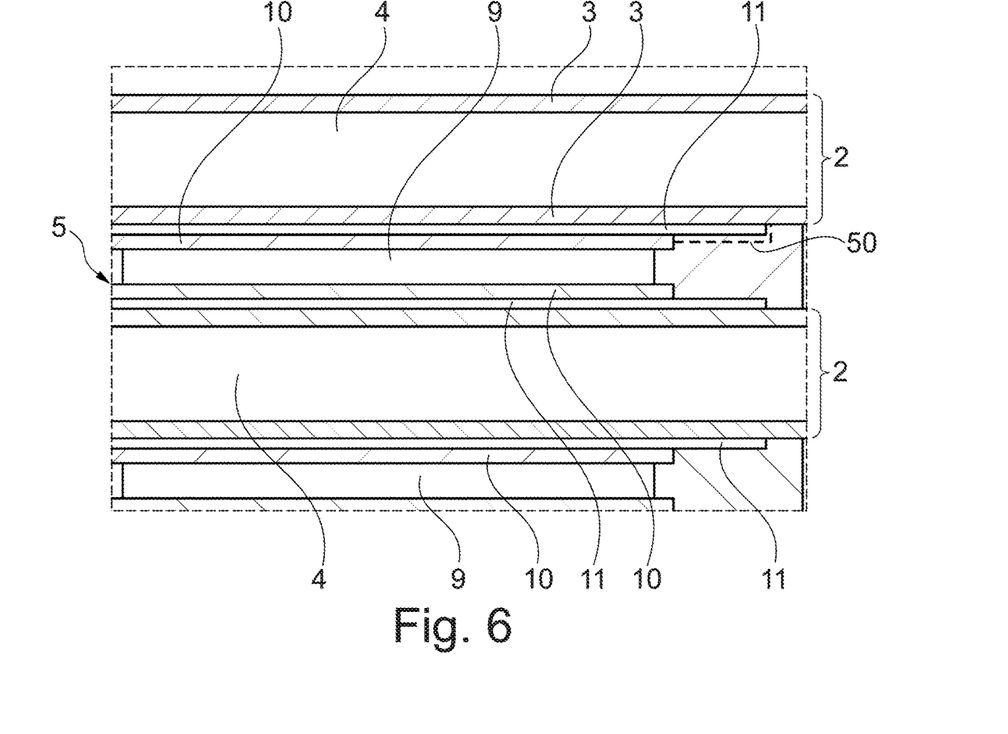
FIG. 6 is a partial sectional view of the electric heating device according to the invention.

FIGS. 4 and 5 show that the heating unit 8 has a frame 12 for arrangement of the heating elements 9 of the heating unit 8 relative to one another and/or for defined positioning of the heating elements 9 of the heating unit 8 in the free space 5 and/or for distribution of the adhesive. In this design, the frame 12 surrounds or delimits the heating unit 8 on at least three sides or on four sides, see FIGS. 4 and 5.

In this case the frame 12 can be designed as a rigid frame, see FIGS. 4 and 5, or alternatively as a collapsible frame. In this case at least one projecting edge 13, in particular beveled edge, at least one ridge 14, at least one nub are provided on the frame 12, in particular for distribution of the adhesive.

In this case a ridge 15, in particular central ridge, can also be provided that projects from the edge.

To manufacture the electric heating device 1, a method for manufacturing an electric heating device 1 is used, wherein the electric heating device 1 with at least two plate pairs 2 forming a fluid passage 4 through which fluid can flow, which plate pairs are assembled from two plates 3 and form a fluid passage 4 between the two, wherein the plate pairs 2 take on a predefined distance from one another and form a free space 5, wherein at least one heating unit 8 is arranged in the free space 5 between at least two of the plate pairs 2, which heating unit has at least one heating element 9 and contact electrodes 10 electrically connected thereto for making electrical contact with the at least one heating element 9, having the steps: providing and stacking the plates 3 into a stack 7 of plates 3 and/or plate pairs 2, soldering the stack 7 of plates 3, partial sealing of one side at a time of at least one free space by means of sealing elements, filling of the partially sealed free space 5 with an adhesive, inserting the heating unit 8 into the free space 5 filled with the adhesive, and curing of the adhesive.

In this case, the sealing elements are removed, in particular after the curing of the adhesive.

In order to improve the bonding and to avoid air bubbles, the free space 5 is at least partially evacuated prior to the filling with the adhesive.

Subsequently, excess adhesive is expelled from the free space 5 during insertion of the heating unit 8 into the free space 5.

According to another exemplary embodiment, the insertion of the heating unit 8 into the relevant free space 5 can also take place prior to the feeding of the adhesive.

The method can include the following steps: providing and stacking the plates 3 into a stack 7 of plates 3 and/or plate pairs 2, soldering the stack 7 of plates 3, and inserting and attaching the heating unit 8 in the free space 5.

In this case, the attachment of the heating unit 8 in the free space 5 to the plate pairs 2 can be accomplished with at least one adhesive.

In this case, as described above, the at least one adhesive can be fed into the free space 5 before the insertion of the heating unit 8 or the at least one adhesive can be fed into the remaining free space 5 after the insertion of the heating unit 8.

In one exemplary embodiment, it is also possible that an insertion of the heating unit 8 takes place into the free space filled with the at least one adhesive, or the heating unit 8 is inserted into the free space 5 before the feeding of the at least one adhesive and subsequently the at least one adhesive is fed, in particular, into the free space 5 that has been partially sealed beforehand.

Figure 7:
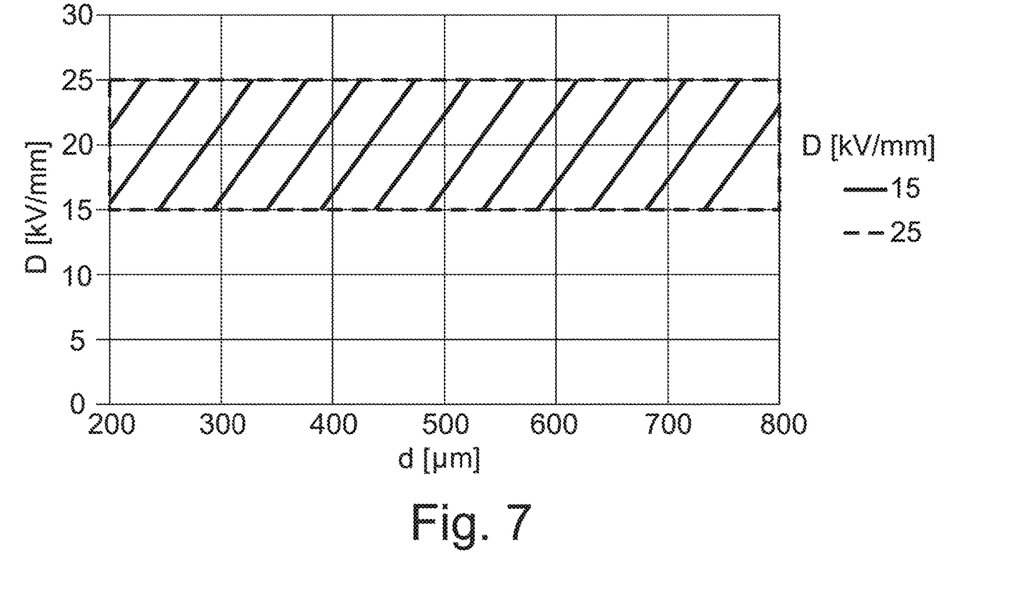
FIG. 7 is a graph to explain the invention.
Figure 8:
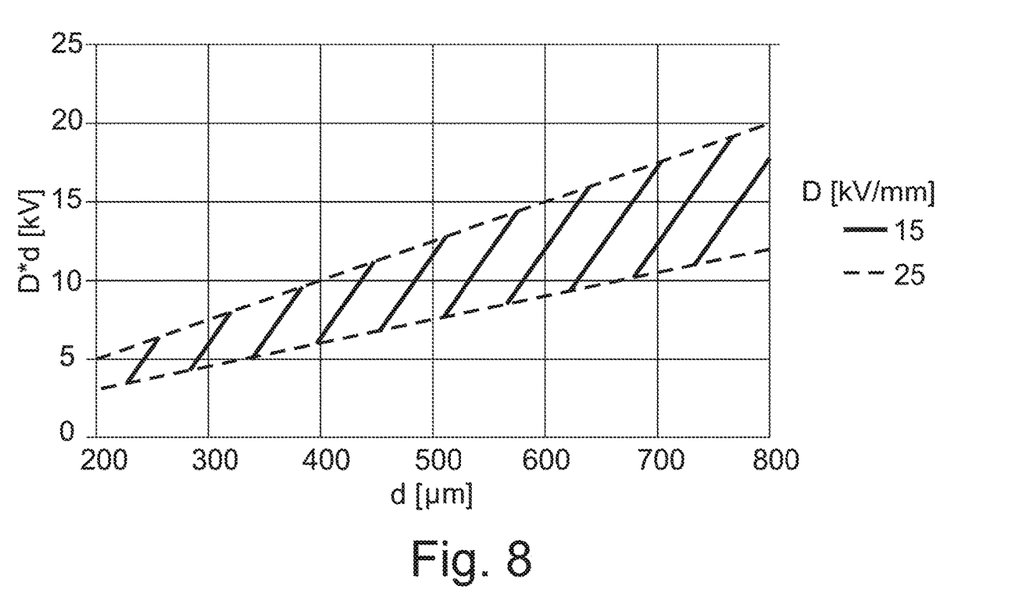
FIG. 8 is a graph to explain the invention.
Figure 9:
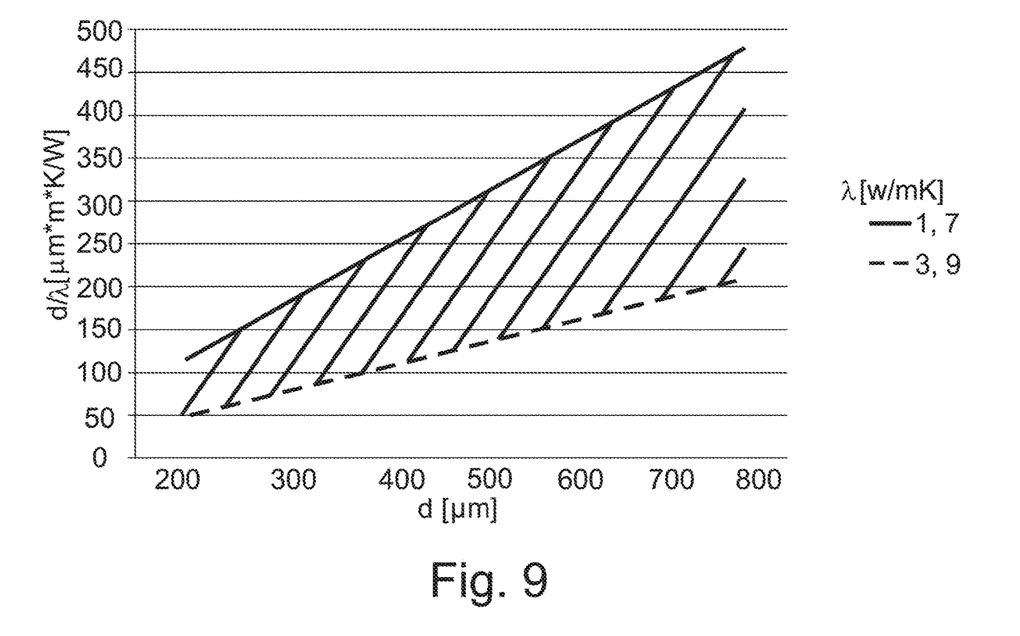
FIG. 9 is a graph to explain the invention.

FIGS. 7 to 9 show different graphs regarding the layer thickness d in μm of the insulating material, the dielectric strength D in kV/mm of the insulating material, and the thermal conductivity λ in W/mK of the insulating material, respectively. Here, the insulating material is the layer of the adhesive that is formed between the heating unit 8 and the opposite plate 3.

In this context, the layer thickness d should be in the range from approximately 0.2 mm to 0.8 mm, which is to say between 200 μm and 800 μm. The dielectric strength along the creepage path 50 should be between 15 kV/mm and 25 kV/mm in this context. The creepage path 50 is drawn in FIG. 6 by way of example here. The thermal conductivity λ is advantageously between 1.7 W/mK and 3.9 W/mK. FIG. 7 indicates the advantageous range for d between 200 μm and 800 μm and for D between 15 kV/mm and 25 kV/mm.

In this context, the value of D*d specifies the dielectric strength that is to be expected for a recommended layer thickness, in particular for d between 200 µm and 800 µm, see FIG. 8. Thus, in a high voltage application with a voltage of 400 V, for example, it can be sufficient for the layer thickness d to be 0.3 mm. The test voltage would be 2000 V, for example. However, manufacturing tolerances and process-related minimum layer thicknesses also play a role in the choice of layer thickness d here.

FIG. 9 shows a graph with the value $d/\lambda$ as a function of d. The thermal conductivity $\lambda$ of the insulating material should advantageously be between 1.7 W/mK and 3.9 W/mK. Here, $d/\lambda$ specifies the thermal resistance through the insulation that is to be expected. The thermal conductivity $\lambda$ and the thermal resistance are inversely proportional here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing an electric heating device comprising at least two plate pairs with each of the at least two plate pairs forming a fluid passage through which fluid is adapted to flow, the at least two plate pairs each being assembled from two plates that form the fluid passage therebetween, wherein the at least two plate pairs take on a predefined distance from one another and form a free space, wherein at least one heating unit is arranged in the free space between the at least two plate pairs, the at least one heating unit having at least one heating element and contact electrodes electrically connected thereto for making electrical contact with the at least one heating element, the method comprising:

providing and stacking plates into a stack of plates having the at least two plate pairs;
soldering the stack of plates; and
inserting and attaching the at least one heating unit in the free space between the at least two plate pairs,
wherein the at least one heating unit is attached to the at least two plate pairs in the free space via at least one adhesive that is fed into the free space and that subsequently cures, the at least one adhesive simultaneously forming an electrical insulation of the contact electrodes with respect to a relevant adjacent plate.

2. The method according to claim 1, wherein the at least one adhesive is fed into the free space before insertion of the at least one heating unit into the free space or wherein the at least one adhesive is fed into the space after insertion of the at least one heating unit into the free space.

3. The method according to claim 1, wherein a partial sealing of one side at a time of the free space is accomplished via sealing elements before the at least one adhesive is fed into the free space.

4. The method according to claim 3, wherein after the partial sealing of the free space, the free space is filled with the at least one adhesive.

5. The method according to claim 4, wherein after the partial sealing of the free space, the free space is filled with the at least one adhesive and an insertion of the at least one heating unit into the free space already filled with the at least one adhesive takes place, or wherein the at least one heating unit is inserted into the free space before the feeding of the at least one adhesive and subsequently the at least one adhesive is fed into the free space that has been partially sealed beforehand.

6. The method according to claim 1, wherein the at least one adhesive is an adhesive substance, a silicone compound, a potting compound, a cross-linkable plastic molding compound, and/or a flowable substance.

7. The method according to claim 1, wherein the at least one adhesive includes a plurality of different adhesives.

8. The method according to claim 3, wherein the sealing elements are removed after the at least one adhesive has cured.

9. The method according to claim 1, wherein the at least one adhesive is electrically insulating and thermally conductive.

10. The method according to claim 9, wherein the at least one adhesive contains agents and/or particles for improving the thermal conductivity of the at least one adhesive.

11. The method according to claim 1, wherein the free space is at least partially evacuated prior to the filling with the adhesive.

12. The method according to claim 1, wherein the at least one adhesive is fed into the free space before insertion of the at least one heating unit, and wherein excess adhesive is expelled from the free space during the insertion of the at least one heating unit into the free space.

13. The method according to claim 1, wherein the at least one heating unit has a frame for arrangement of the at least one heating element and/or for defined positioning of the at least one heating element in the free space.

14. The method according to claim 1, wherein the stack of plates is provided with an inlet connection and an outlet connection prior to soldering, and/or wherein the fluid passages of the at least two plate pairs are in fluid connection with one another.

15. The method according to claim 14, wherein the inlet connection and the outlet connection are arranged on a same plate pair of the stack of plates or on an end plate pair of the stack of plates or wherein the inlet connection and the outlet connection are arranged on different plate pairs of the stack of plates or on opposing end plate pairs of the stack of plates.

16. An electric heating device comprising:

at least two plate pairs with each of the at least two plate pairs forming a fluid passage through which fluid is adapted to flow, the at least two plate pairs each being assembled from two plates that form a fluid passage therebetween;
a free space formed between the at least two plate pairs that are spaced a predefined distance from one another; and
at least one heating unit arranged in the free space between the at least two of plate pairs, the at least one heating unit having at least one heating element and contact electrodes electrically connected thereto for making electrical contact with the at least one heating element,
wherein the at least one heating unit is held in the free space via at least one adhesive that subsequently cures, and
wherein the at least one adhesive simultaneously forms an electrical insulation of the contact electrodes with respect to a relevant adjacent plate.

17. The electric heating device according to claim 16, wherein the at least two plate pairs are stacked to form a stack of plates and wherein the stack of plates is soldered and the at least one heating unit is inserted into the free space after the soldering.

18. The electric heating device according to claim 16, wherein the at least one adhesive is electrically insulating and thermally conductive.

19. The electric heating device according to claim 16, wherein the at least one adhesive is an adhesive substance, a silicone compound, a potting compound, a cross-linkable plastic molding compound, and/or a flowable substance.

20. The electric heating device according to claim 18, wherein the at least one adhesive contains agents and/or particles for improving the thermal conductivity of the at least one adhesive.

21. The electric heating device according to claim 16, wherein the at least one heating unit has a frame for arrangement of the at least one heating element and/or for defined positioning of the at least one heating element in the free space and/or for distribution of the at least one adhesive.

22. The electric heating device according to claim 21, wherein the frame surrounds or delimits the at least one heating unit on at least three sides or on four sides.

23. The electric heating device according to claim 21, wherein the frame is a rigid frame or a collapsible frame.

24. The electric heating device according to claim 21, wherein at least one projecting edge, a beveled edge, at least one ridge, or at least one nub is provided on the frame for distribution of the at least one adhesive.

25. The electric heating device according to claim 21, wherein a central ridge projects from the frame.

26. The method according to claim 1, wherein the inserting and the attaching of the at least one heating unit in the free space between the at least two plate pairs occurs after the soldering of the stack of plates.

27. The electric heating device according to claim 16, wherein a partial sealing of one side at a time of the free space is accomplished via sealing elements before the at least one adhesive is fed into the free space, and wherein the sealing elements are removed after the at least one adhesive has cured.

* * * * *